United States Patent
Mori et al.

(10) Patent No.: US 12,429,122 B2
(45) Date of Patent: Sep. 30, 2025

(54) LINEAR ACTUATOR

(71) Applicant: ADVICS CO., LTD., Kariya (JP)

(72) Inventors: Hayato Mori, Kariya (JP); Yoshihiko Sawagashira, Kariya (JP)

(73) Assignee: ADVICS CO., LTD., Kariya (JP)

( * ) Notice: Subject to any disclaimer, the term of this patent is extended or adjusted under 35 U.S.C. 154(b) by 0 days.

(21) Appl. No.: 18/568,604

(22) PCT Filed: Jun. 28, 2022

(86) PCT No.: PCT/JP2022/025704
§ 371 (c)(1),
(2) Date: Dec. 8, 2023

(87) PCT Pub. No.: WO2023/276999
PCT Pub. Date: Jan. 5, 2023

(65) Prior Publication Data
US 2024/0271683 A1     Aug. 15, 2024

(30) Foreign Application Priority Data

Jul. 2, 2021   (JP) ................. 2021-110870

(51) Int. Cl.
*F16H 25/24*   (2006.01)
*F16H 25/20*   (2006.01)

(52) U.S. Cl.
CPC ..... *F16H 25/24* (2013.01); *F16H 2025/2075* (2013.01); *F16H 2025/2087* (2013.01)

(58) Field of Classification Search
CPC ............... F16H 2025/2075; F16H 2025/2087
See application file for complete search history.

(56) References Cited

U.S. PATENT DOCUMENTS

| | | | |
|---|---|---|---|
| 10,378,623 B2 | 8/2019 | Weh et al. | |
| 10,669,766 B2 * | 6/2020 | Sakiyama | ............... E05F 15/63 |
| 11,136,016 B2 * | 10/2021 | Weh | ............... F04B 9/02 |
| 11,384,820 B2 * | 7/2022 | Jørgensen | ............... F16H 25/24 |
| 2006/0102697 A1 | 5/2006 | Nagai et al. | |
| 2018/0193994 A1 * | 7/2018 | Pellenc | ............... B25F 5/001 |
| 2019/0376586 A1 * | 12/2019 | Shimizu | ............... F16H 25/24 |

FOREIGN PATENT DOCUMENTS

| | | | |
|---|---|---|---|
| JP | H07-241065 A | * | 9/1995 |
| JP | 2006174690 A | | 6/2006 |

OTHER PUBLICATIONS

Wikipedia, Plain Bearings, Nov. 5, 2022 (Year: 2022).*
International Search Report (PCT/ISA/210) with translation and Written Opinion (PCT/ISA/237) mailed on Sep. 13, 2022, by the Japan Patent Office as the International Searching Authority for International Application No. PCT/JP2022/025704. (9 pages).

* cited by examiner

*Primary Examiner* — Gregory Robert Weber
(74) *Attorney, Agent, or Firm* — BUCHANAN INGERSOLL & ROONEY PC

(57) ABSTRACT

A linear actuator includes an electric motor and a linear motion conversion mechanism. The linear motion conversion mechanism includes a screw shaft and a nut screwed into the screw shaft, and is configured such that the nut moves linearly according to a rotation of the screw shaft. The screw shaft is provided with a hole coaxial with an axis of rotation in this linear actuator. Then, the electric motor and the linear motion conversion mechanism are axially aligned by inserting the distal end portion of the motor shaft, which is coaxial with the rotor of the electric motor and rotates integrally, into the hole.

12 Claims, 5 Drawing Sheets

LINEAR ACTUATOR

TECHNICAL FIELD

The present disclosure relates to a linear actuator.

BACKGROUND ART

A linear actuator including an electric motor, a deceleration mechanism, and a linear motion conversion mechanism as disclosed in Patent Literature 1 is known. A screw mechanism including a rotatable nut and a screw shaft linearly moving in an extending direction of a rotation axis of the nut according to a rotation of the nut is adopted as the linear motion conversion mechanism in the linear actuator of Patent Literature 1. In addition, a planetary gear mechanism is adopted as the deceleration mechanism in the linear actuator of Patent Literature 1. A sun gear of the planetary gear mechanism is connected to the electric motor, and each planetary gear of the planetary gear mechanism is rotatably supported by the nut of the linear motion conversion mechanism in the linear actuator of Patent Literature 1.

Furthermore, the linear actuator in Patent Literature 1 includes an axis alignment plate having holes through which gear shafts of the sun gear and planetary gears are inserted, respectively. The plate aligns a revolution axis of planetary gears with the rotation axis of the sun gear.

CITATIONS LIST

Patent Literature

Patent Literature 1: U.S. Pat. No. 10,378,623

SUMMARY

Technical Problems

In the linear actuator as described above, a coaxiality between the rotation axes of the electric motor and the linear motion conversion mechanism may be required. On the other hand, the axis alignment plate of the conventional linear actuator aligns the rotation axis of the sun gear of the planetary gear mechanism with the revolution axis of the planetary gears. The rotation axes of the electric motor and the linear motion conversion mechanism can be aligned only indirectly when using such a plate. Therefore, there is a possibility that an accuracy of axial alignment of the rotation axes of the electric motor and the linear motion conversion mechanism cannot be sufficiently secured.

Solutions to Problems

A linear actuator for solving the above problem includes a linear motion conversion mechanism and an electric motor. The linear motion conversion mechanism includes a screw shaft and a nut screwed into the screw shaft, and one of the screw shaft and the nut functions as a rotatable rotation member while the other of the screw shaft and the nut functions as a linear motion member moving linearly according to a rotation of the rotation member. The electric motor includes a rotor rotating coaxially with the rotation member. Then, the electric motor rotates the rotation member according to the rotation of the rotor. Furthermore, the linear actuator includes a shaft member connected to the rotor so as to rotate integrally with the rotor. In addition, the screw shaft is provided with a hole, where an axial alignment between the rotation axis of the rotation member and the rotation axis of the rotor is performed by inserting the shaft member into the screw shaft in the linear actuator.

In the above described linear actuator, the axial alignment between the rotation axis of the rotation member and the rotation axis of the rotor, i.e., the axial alignment between the electric motor and the linear motion conversion mechanism is performed by inserting the shaft member into the hole provided in the screw shaft. The shaft member inserted into the hole of the screw shaft is connected to the rotor of the electric motor so as to rotate integrally. Therefore, it is possible to directly align the axes of the electric motor and the linear motion conversion mechanism. As a result, it is possible to easily and accurately perform the axial alignment between the electric motor and the linear motion conversion mechanism by the above described linear actuator.

DESCRIPTION OF EMBODIMENTS

Figure 1:
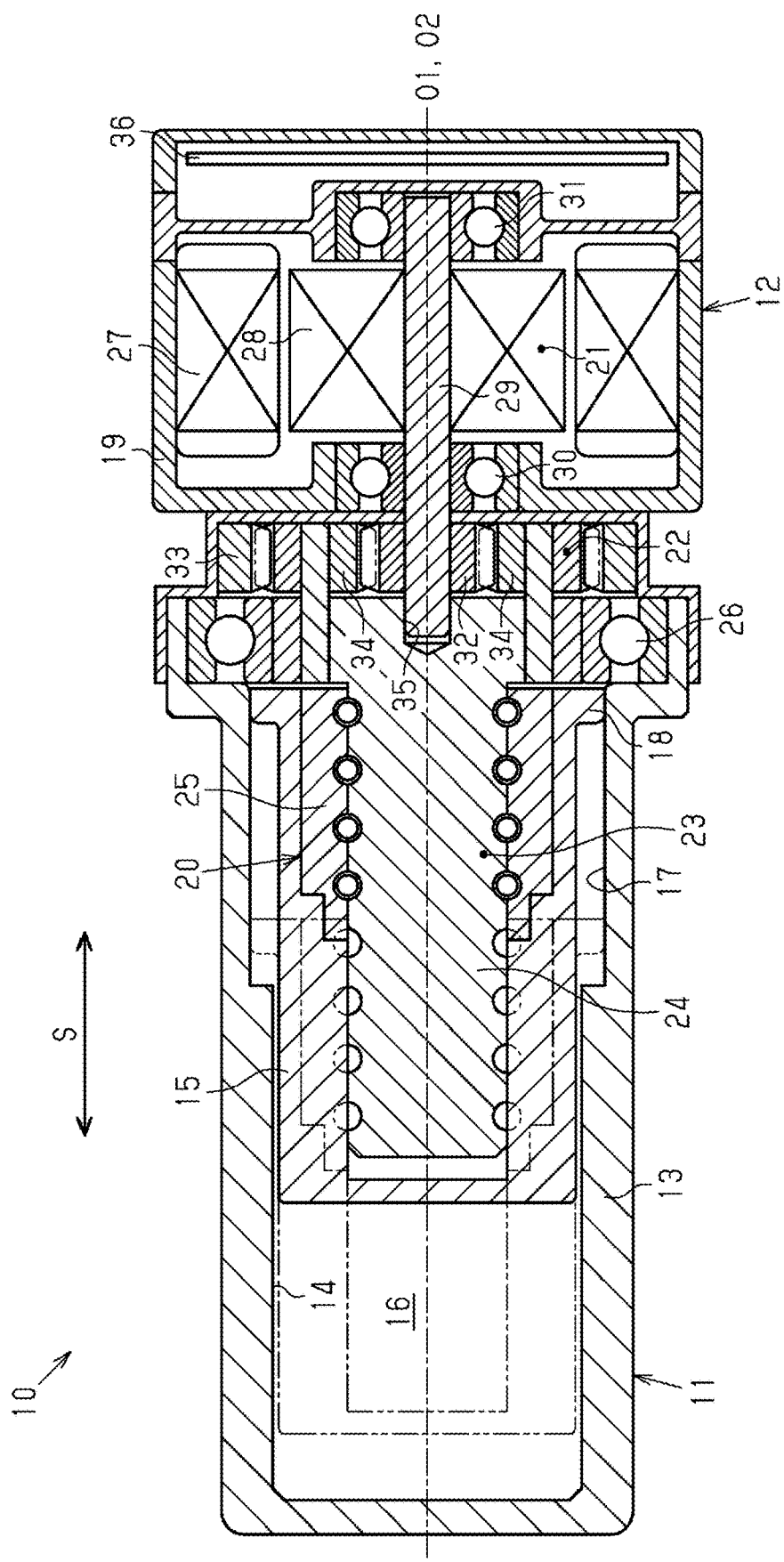
FIG. 1 is a cross-sectional view of an electric cylinder provided with an embodiment of a linear actuator.

Hereinafter, an embodiment of a linear actuator will be described with reference to FIGS. 1 and 2. A linear actuator 20 of the present embodiment is provided in an electric cylinder 10 that generates, for example, a liquid pressure converted into a braking force in a braking device for a vehicle or the like.

<Configuration of Electric Cylinder 10>

First, the configuration of the electric cylinder 10 will be described with reference to FIG. 1. The electric cylinder 10 includes a cylinder 14 and a piston 15 that slides in the cylinder 14. In the following description, a sliding direction of the piston 15 in the cylinder 14 is referred to as a stroke direction S. A liquid chamber 16 filled with brake fluid is defined by the piston 15 in the cylinder 14. The electric cylinder 10 presses the brake fluid in the liquid chamber 16 by an operation of the piston 15 to generate the liquid pressure to be converted into the braking force. Grooves 17 extending in the sliding direction of the piston 15 are formed in a side wall of the cylinder 14. Projections 18 formed on the piston 15 are engaged with the grooves 17. The engagement between the grooves 17 and the projections 18 prevents a rotation of the piston 15 in the cylinder 14.

Note that the electric cylinder 10 mainly includes two units of a cylinder unit 11 and a motor unit 12. The electric cylinder 10 is manufactured by assembling the cylinder unit 11 and the motor unit 12 individually and then assembling them integrally. The cylinder 14 and the piston 15 are provided in the cylinder unit 11.

<Configuration of Linear Actuator 20>

The electric cylinder 10 is provided with the linear actuator 20 for driving the piston 15. The linear actuator 20 includes an electric motor 21, a deceleration mechanism 22, and a linear motion conversion mechanism 23. Among them, the deceleration mechanism 22 and the linear motion conversion mechanism 23 are provided in the cylinder unit 11, and the electric motor 21 is provided in the motor unit 12. In addition, the motor unit 12 is provided with a control board 36 for power control of the electric motor 21. In a state where the cylinder unit 11 and the motor unit 12 are integrally assembled, the electric motor 21, the deceleration mechanism 22, and the linear motion conversion mechanism 23 are arranged in series in the stroke direction S.

The linear motion conversion mechanism 23 is a screw mechanism having a screw shaft 24 and a nut 25 screwed into the screw shaft 24. A ball screw mechanism in which a ball circulation mechanism is incorporated in the nut 25 is adopted as the linear motion conversion mechanism 23 in the present embodiment. The screw shaft 24 is attached to a case 13 of the cylinder unit 11 in the state of being rotatably supported by a bearing 26. On the other hand, the nut 25 is connected to the piston 15 so as to slide integrally in the stroke direction S. The linear motion conversion mechanism 23 converts the rotation of the screw shaft 24 into the linear motion of the nut 25 in the stroke direction S.

The electric motor 21 includes a stator 27 fixed to a case 19 of the motor unit 12 and a rotor 28 disposed on the radially inner side of the stator 27. A motor shaft 29, which is a cylindrical shaft member, is coaxially connected to the rotor 28 so as to rotate integrally. The motor shaft 29 is a shaft member located on an axis of rotation O2 of the rotor 28 and extending along the axis of rotation O2 of the rotor 28. The motor shaft 29 is attached to the case 19 of the motor unit 12 in the state of being rotatably supported by bearings 30 and 31. A part of the motor shaft 29 protrudes from the case 19 in a direction in which the cylinder unit 11 is located as viewed from the motor unit 12.

The deceleration mechanism 22 is a mechanism that decelerates the rotation of the rotor 28 of the electric motor 21 and transmits the decelerated rotation to the screw shaft 24 of the linear motion conversion mechanism 23. A planetary gear mechanism is adopted as the deceleration mechanism 22 in the present embodiment. Such a deceleration mechanism 22 includes a sun gear 32 that is an external tooth gear, a ring gear 33 that is an internal tooth gear disposed radially outside the sun gear 32, and a plurality of planetary gears 34 interposed between the sun gear 32 and the ring gear 33. The motor shaft 29 is inserted through the sun gear 32. The sun gear 32 and the motor shaft 29 are connected so as to rotate integrally by spline engagement or the like. The ring gear 33 is fixed to the case 13 of the cylinder unit 11. Furthermore, each planetary gear 34 is rotatably attached to the screw shaft 24. That is, the screw shaft 24 also has a function as a planetary carrier of a planetary gear mechanism in the linear actuator 20.

A hole 35, which is drilled on an end surface on a side where the deceleration mechanism 22 is located when viewed from the screw shaft 24, is formed in the screw shaft 24. The hole 35 is a round hole located on an axis of rotation O1 of the screw shaft 24 and extending along the axis of rotation O1 of the screw shaft 24. An inner diameter of the hole 35 is substantially the same as an outer diameter of the motor shaft 29. In the state where the cylinder unit 11 and the motor unit 12 are integrally assembled, a distal end portion of the motor shaft 29 is inserted into the hole 35. As described above, the inner diameter of the hole 35 is substantially the same as the outer diameter of the motor shaft 29. Therefore, the hole 35 at this time is in sliding contact with the distal end portion of the inserted motor shaft 29.

Operation and Effect of Embodiment

The operation and effect of the linear actuator 20 of the present embodiment configured as described above will be explained.

The deceleration mechanism 22 decelerates the rotation of the electric motor 21 and transmits the decelerated rotation to the screw shaft 24 of the linear motion conversion mechanism 23 in the linear actuator 20. The rotation of the screw shaft 24 is converted into the linear motion of the nut 25 in the linear motion conversion mechanism 23. Then, the piston 15 moves in the stroke direction S in the cylinder 14 by the linear motion of the nut 25. Note that a speed difference occurs between the rotations of the motor shaft 29 and the screw shaft 24 at this time.

Among three elements of the electric motor 21, the deceleration mechanism 22, and the linear motion conversion mechanism 23 constituting such a linear actuator 20, the electric motor 21 is installed in the motor unit 12. On the other hand, remaining two elements of the deceleration mechanisms 22 and the linear motion conversion mechanism 23 are installed in the cylinder unit 11. The electric cylinder 10 is manufactured by assembling the cylinder unit 11 and the motor unit 12 integrally. In a case of such a linear actuator 20, when the axis of rotation O1 of the screw shaft 24 of the linear motion conversion mechanism 23 and the axis of rotation O2 of the rotor 28 of the electric motor 21 are axially misaligned, the linear actuator 20 does not operate smoothly. Therefore, when the cylinder unit 11 and the motor unit 12 are integrally assembled, the axial alignment between the axis of rotation O1 of the screw shaft 24 and the axis of rotation O2 of the rotor 28 is required.

Figure 2:
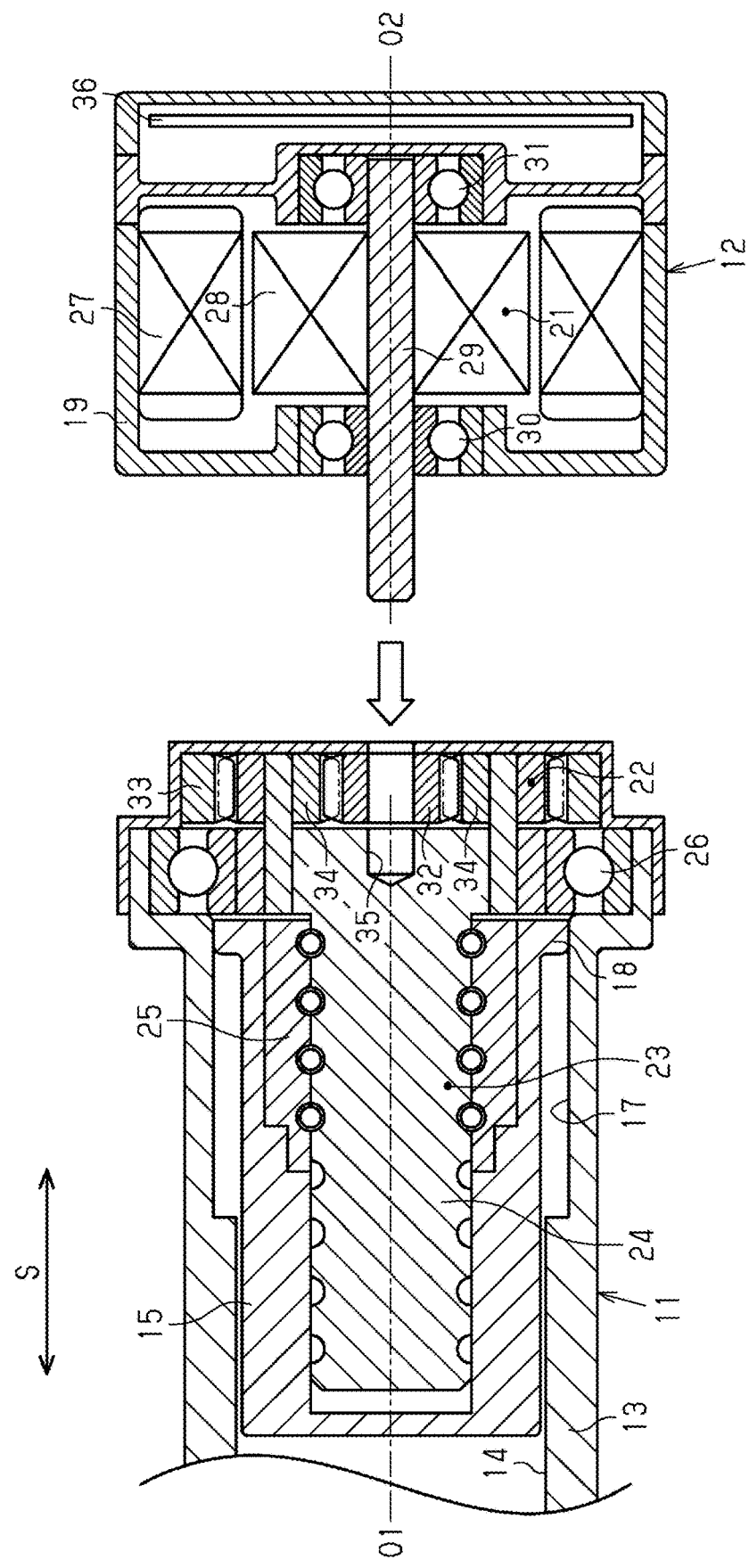
FIG. 2 is a cross-sectional view illustrating a state at a time of assembling the linear actuator.

FIG. 2 illustrates a state at a time of assembling the cylinder unit 11 and the motor unit 12 in the electric cylinder 10. As illustrated in the drawing, the distal end portion of the motor shaft 29 is inserted into the hole 35 provided in the screw shaft 24 through the sun gear 32 when the cylinder unit 11 and the motor unit 12 are assembled. The inner diameter of the hole 35 is substantially the same as the outer diameter of the distal end portion of the motor shaft 29. Therefore, the hole 35 and the motor shaft 29 are coaxial in the state where the distal end portion is inserted. On the other hand, the hole 35 is formed so as to be coaxial with the axis of rotation O1 of the screw shaft 24. The motor shaft 29 is connected to the rotor 28 so as to rotate coaxially and integrally. Therefore, the axis of rotation O1 of the screw shaft 24 and the axis of rotation O2 of the rotor 28 are aligned by inserting the distal end portion of the motor shaft 29 into the hole 35. As described above, the axial alignment between the electric motor 21 and the linear motion conversion mechanism 23 can be easily performed with high accuracy in the linear actuator 20 of the present embodiment.

The linear motion conversion mechanism 23 is configured such that the nut 25 moves linearly according to the rotation of the screw shaft 24 in the linear actuator 20 of the present embodiment. On the other hand, in the case where the linear motion conversion mechanism 23 is configured such that the screw shaft 24 moves linearly according to the rotation of the nut 25, there is a possibility that the screw shaft 24 moves in the stroke direction S during the assembly work, and the distal end portion of the motor shaft 29 slips out of the hole 35. When the assembly is performed in this state, the coaxiality between the axis of rotation O1 of the screw shaft 24 and the axis of rotation O2 of the rotor 28 cannot be obtained. On the other hand, the screw shaft 24 does not move in the stroke direction S during the assembly work in the case of the present embodiment. Therefore, the axial alignment between the linear motion conversion mechanism 23 and the electric motor 21 can be performed more reliably.

When the linear motion conversion mechanism 23 is configured such that the screw shaft 24 moves linearly according to the rotation of the nut 25, the screw shaft 24 moves in the stroke direction S according to the operation of the linear actuator 20. Then, the distal end portion of the motor shaft 29 enters and exits the hole 35 of the screw shaft 24 according to the movement of the screw shaft 24. At the time of such an entry and exit, the motor shaft 29 may not be appropriately inserted into the hole 35, and the screw shaft 24 and the motor shaft 29 may interfere with each other. On the other hand, the linear motion conversion mechanism 23 of the present embodiment is configured such that the nut 25 linearly moves according to the rotation of the screw shaft 24. Therefore, the state in which the motor shaft 29 is inserted into the hole 35 is maintained even during the operation of the linear actuator 20. Therefore, the interference between the screw shaft 24 and the motor shaft 29 as described above does not occur during the operation of the linear actuator 20.

The screw shaft 24 corresponds to the rotation member while the nut 25 corresponds to the linear motion member in the present embodiment. In addition, the hole 35 provided in the screw shaft 24 and the motor shaft 29 configure an axial alignment structure that aligns the axis of rotation O1 of the screw shaft 24 and the axis of rotation O2 of the rotor 28. Then, the motor shaft 29 corresponds to the shaft member in the axial alignment structure.

The motor shaft 29 is connected to the sun gear 32 of the deceleration mechanism 22 in the linear actuator 20 of the present embodiment. The screw shaft 24 constitutes the planetary carrier of the deceleration mechanism 22. That is, the screw shaft 24 has functionally a structure in which the rotation member of the linear motion conversion mechanism 23 and the planetary carrier of the deceleration mechanism 22 are integrally connected. The axial alignment between the axis of rotation O1 of the screw shaft 24 and the rotation axis of the motor shaft 29 is performed by inserting the motor shaft 29 into the hole 35 provided in the screw shaft 24 in the linear actuator 20 of the present embodiment. As a result, the rotation axis of the sun gear 32 of the deceleration mechanism 22 and the rotation axis of the planetary carrier, i.e., the revolution axis of the planetary gears 34 are aligned. As described above, the axial alignment between the rotation axis of the sun gear 32 of the deceleration mechanism 22 and the revolution axis of the planetary gears 34 is performed at the same time in addition to the axial alignment between the rotation axes of the electric motor 21 and the linear motion conversion mechanism 23 in the axial alignment structure in the linear actuator 20 of the present embodiment.

Other Embodiments

The present embodiment can be modified as described below. The present embodiment and following modifications can be implemented in combination with each other within a range not technically contradictory.

<Axial Alignment Structure of Linear Actuator 20>

The motor shaft 29 that transmits the rotation of the rotor 28 of the electric motor 21 to the sun gear 32 is extended to the linear motion conversion mechanism 23 side from the sun gear 32 in the above embodiment. The extended distal end portion of the motor shaft 29 is inserted into the hole 35 provided in the screw shaft 24 to align the electric motor 21 and the linear motion conversion mechanism 23 axially. That is, the motor shaft 29 is formed as an integrated component including a portion to be inserted into the hole 35 at the time of the axial alignment. The portion to be inserted into the hole 35 at the time of such an axial alignment may be a separate component from the motor shaft 29. The portion to be inserted into the hole 35 at this time is a following shaft member. That is, the shaft member is a shaft member that is positioned on the axis of rotation O2 of the rotor 28 and extends along the axis of rotation O2 of the rotor 28, and is the shaft member that rotates integrally with the rotor 28. For example, the motor shaft 29 has a length from the rotor 28 to the sun gear 32. A metal pin insertable into the hole 35 of the screw shaft 24 is connected to the distal end of the motor shaft 29 so as to rotate integrally with the motor shaft 29. Even in such a case, the electric motor 21 and the linear motion conversion mechanism 23 are axially aligned by inserting the metal pin into the hole 35.

The deceleration mechanism 22 decelerates the rotation of the rotor 28 of the electric motor 21 and transmits the decelerated rotation to the screw shaft 24 in the linear actuator 20 of the above embodiment. Therefore, the screw shaft 24 rotates relative to the motor shaft 29 during the operation of the linear actuator 20. On the other hand, the axial alignment between the electric motor 21 and the linear motion conversion mechanism 23 is performed by inserting the distal end portion of the motor shaft 29 into the hole 35 provided in the screw shaft 24 in the linear actuator 20 of the above embodiment. It is necessary to tightly fit the distal end portion of the motor shaft 29 to the hole 35 in order to increase the coaxiality. However, in such a case, since a sliding resistance between the distal end portion of the motor shaft 29 and the hole 35 at the time of relative rotation increases, there is the possibility that smooth operation of the linear actuator 20 is prevented. When the structures of the following modifications 1 to 3 are adopted as the axial alignment structure of the electric motor 21 and the linear motion conversion mechanism 23, both improvement in the axial alignment accuracy and the smooth operation of the linear actuator 20 can be achieved.

<Modification 1>

Figure 3:
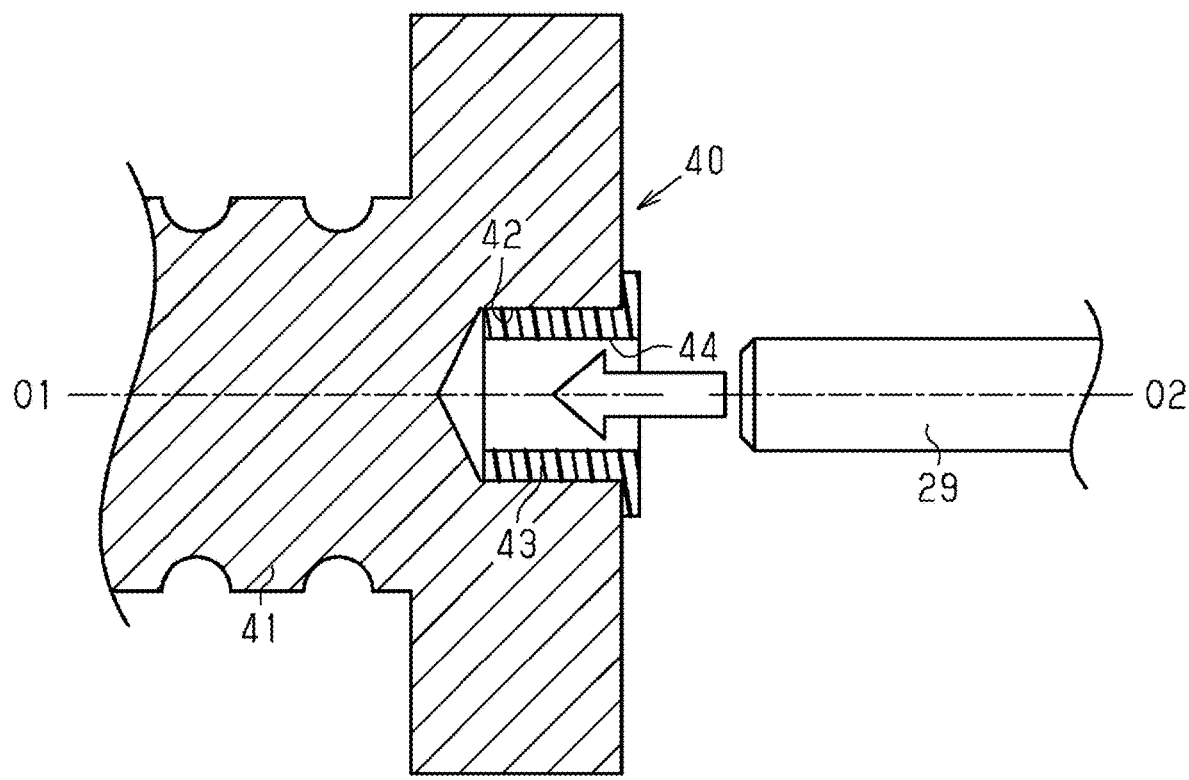
FIG. 3 is a schematic view of an axial alignment structure provided in Modification 1 of the linear actuator.

The configuration of Modification 1 of the axial alignment structure of the linear actuator 20 will be described with reference to FIG. 3. A screw shaft 40 of the linear actuator 20 of Modification 1 includes a metal base 41 and a resin bush 43 which is a bush made of resin. A bush attachment hole 42, which is drilled from the end surface on the side where the deceleration mechanism 22 is located when viewed from the screw shaft 40, is formed in the base 41. Then, the resin bush 43 is attached to the bush attachment hole 42. The resin bush 43 has a through hole 44 that passes through in the extending direction of an axis of rotation O1 of the screw shaft 40. When the cylinder unit 11 and the motor unit 12 are assembled, the distal end portion of the motor shaft 29 is inserted into the through hole 44. The motor shaft 29 whose distal end portion is inserted into the through hole 44 of the resin bush 43 is made of metal.

The axis of rotation O1 of the screw shaft 40 and the axis of rotation O2 of the rotor 28 are aligned by inserting the motor shaft 29 into the through hole 44 in Modification 1. That is, the through hole 44 of the resin bush 43 provided in the screw shaft 40 corresponds to the hole of the axial alignment structure, and the motor shaft 29 corresponds to the shaft member of the axial alignment structure. The contact surface of the hole with the shaft member is formed of a resin material, and the contact surface of the shaft member with the hole is formed of a metal material in Modification 1.

When the axial alignment structure of Modification 1 is adopted, the distal end portion of the motor shaft 29 is in sliding contact with the resin bush 43. The surface of the through hole 44 of the resin bush 43 formed of resin has lower hardness than the metal motor shaft 29 and is easily worn. Therefore, when the linear actuator 20 operates to rotate the screw shaft 40 and the motor shaft 29 relatively, wear of the surface of the through hole 44 in the resin bush 43 progresses, and the sliding resistance between the motor shaft 29 and the through hole 44 decreases. Therefore, it is possible to achieve both improvement in the axial alignment accuracy and the smooth operation of the linear actuator 20 by adopting the axial alignment structure of Modification 1.

<Modification 2>

Figure 4:
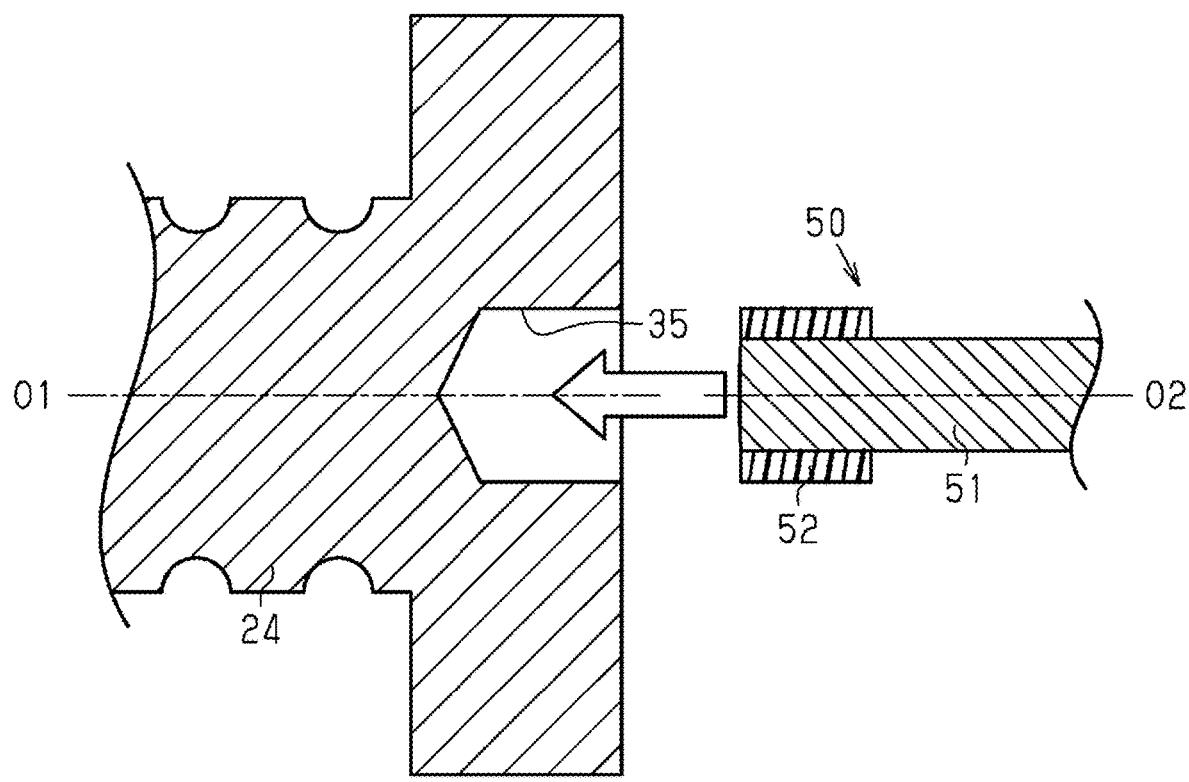
FIG. 4 is a schematic view of an axial alignment structure provided in Modification 2 of the linear actuator.

The configuration of Modification 2 of the axial alignment structure of the linear actuator 20 will be described with reference to FIG. 4. A motor shaft 50 constituting the shaft member of the axial alignment structure in Modification 2 includes a metal base 51 and a resin ring 52 attached to the distal end portion of the base 51 as illustrated in FIG. 4. The base 51 is a columnar member extending in the stroke S direction. The resin ring 52 is a hollow cylindrical member made of resin. The outer diameter of the resin ring 52 is substantially the same as the inner diameter of the hole 35 of the screw shaft 24. The contact surface of the hole 35 with the motor shaft 50 is formed of a metal material while the contact surface of the motor shaft 50 with the hole 35 is formed of a resin material in Modification 2.

When the linear actuator 20 is operated, the screw shaft 24 and the motor shaft 50 rotate relative to each other. At this time, the resin ring 52 rotates together with one of the screw shaft 24 and the base 51 of the motor shaft 50 and rotates relative to the other. As a result, the wear of inner circumference or outer circumference of the resin ring 52 progresses, and the sliding resistance between the motor shaft 50 and the hole 35 decreases. Therefore, it is also possible to achieve both improvement in the axial alignment accuracy and the smooth operation of the linear actuator 20 when the axial alignment structure of Modification 2 is adopted.

As described above, one of the contact surface of the hole with the shaft member and the contact surface of the shaft member with the hole is formed of metal while the other is formed of resin having hardness lower than that of metal in Modification 1 and Modification 2. When one of the two contact surfaces has higher hardness than the other in this manner, the contact surface having lower hardness and being easily worn gradually wears, and the sliding resistance between both the contact surfaces decreases. As a result, it is possible to achieve both improvement in the axial alignment accuracy and the smooth operation of the linear actuator 20. A combination other than the combination of the resin and the metal may be adopted as long as materials having different hardness are combined as the combination of materials of both the contact surfaces.

<Modification 3>

Figure 5:
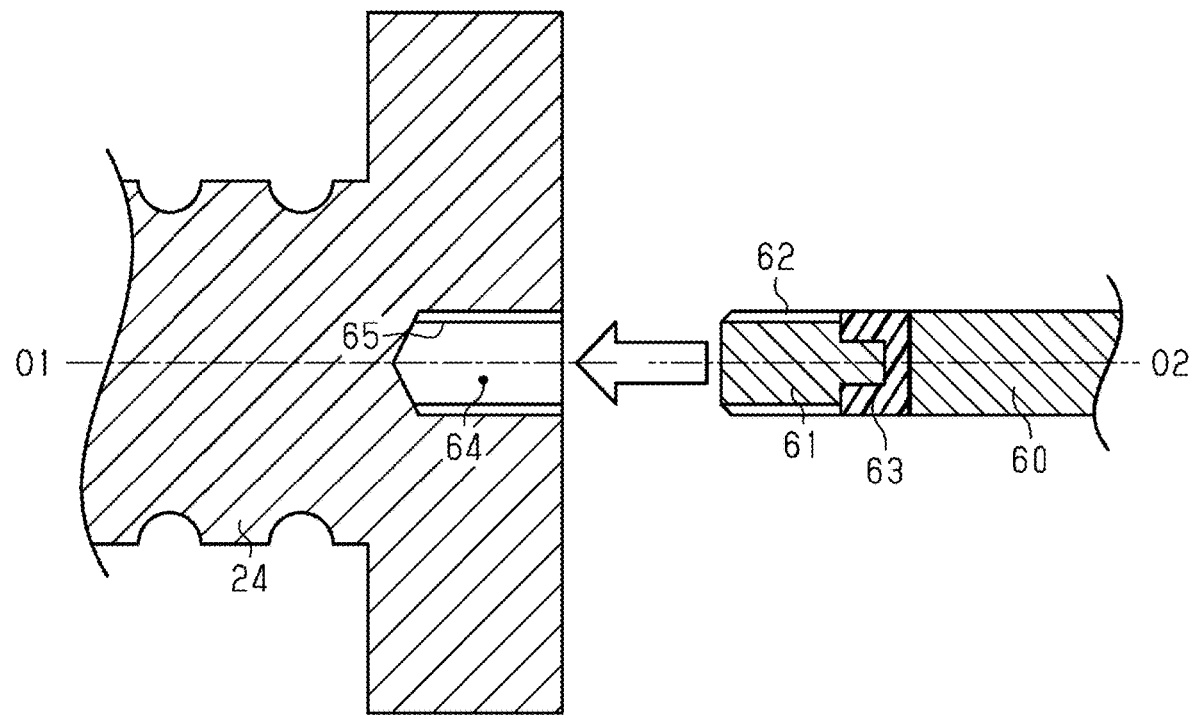
FIG. 5 is a schematic view of an axial alignment structure provided in Modification 3 of the linear actuator.

The configuration of Modification 3 of the axial alignment structure of the linear actuator 20 will be described with reference to FIGS. 5 and 6. A metal pin 61, which is the metal pin attached to the distal end of the motor shaft 29, is used as the shaft member to be inserted into the hole 35 of the screw shaft 24 at the time of axial alignment in the axial alignment structure of Modification 3 as illustrated in FIG. 5.

The metal pin 61 is integrated with the motor shaft 60 by insert molding of the resin. That is, the metal pin 61 is connected to the motor shaft 60 via a resin portion 63 which is the portion formed of the resin. The metal pin 61 has a cylindrical portion having the same outer diameter as the motor shaft 60. Splines 62 are formed on a circumference of the cylindrical portion of the metal pin 61. The extending direction of the splines 62 is the extending direction of the rotation axis of the motor shaft 60, i.e., the extending direction of the axis of rotation O2 of the rotor 28 of the electric motor 21 to which the motor shaft 60 is coaxially connected so as to rotate integrally. On the other hand, the screw shaft 24 is provided with a hole 64 into which the metal pin 61 can be inserted. Splines 65 engageable with the splines 62 of the metal pin 61 are formed on the side wall of the hole 64.

The axial alignment between the electric motor 21 and the linear motion conversion mechanism 23 is performed by inserting the metal pin 61 into the hole 64 of the screw shaft 24 in the linear actuator 20 adopting such an axial alignment structure of Modification 3. In this state, the relative rotation between the screw shaft 24 and the motor shaft 60 is restricted by the engagement of the splines 62 and 65.

Figure 6:
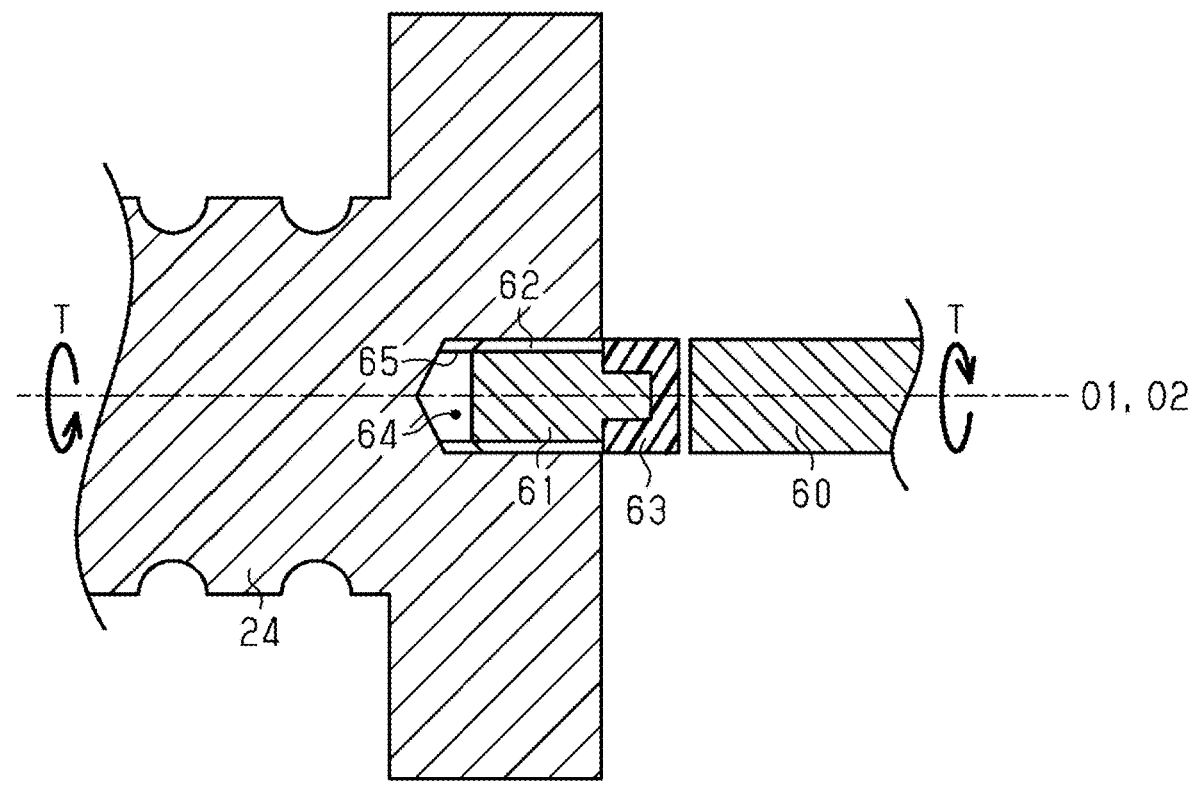
FIG. 6 is a view illustrating a state of the axial alignment structure after the start of use of the linear actuator of Modification 3.

When the electric motor 21 is energized in this state, torsional torque T is generated between the screw shaft 24 and the motor shaft 60 as illustrated in FIG. 6. The torsional torque T breaks a joint between the motor shaft 60 or the metal pin 61 and the resin portion 63. Joint portions between the resin portion 63 and the metal pin 61 and between the resin portion 63 and the motor shaft 60 are fragile portions that are broken according to the relative rotation between the rotor 28 and the screw shaft 24 caused by the operation of the electric motor 21. The metal pin 61 constituting the shaft member of the axial alignment structure of Modification 3 is connected to the rotor 28 via such fragile portions. FIG. 6 illustrates the state where the joint between the motor shaft 60 and the resin portion 63 is broken.

The relative rotation between the screw shaft 24 and the motor shaft 60 is allowed by breaking the joint. Then, the metal pin 61 rotates integrally with the screw shaft 24. Therefore, fitting between the metal pin 61 and the hole 64 does not affect the operation of the linear actuator 20. Therefore, it is also possible to achieve both improvement in the axial alignment accuracy and the smooth operation of the linear actuator 20 when the axial alignment structure of Modification 3 is adopted.

<Configuration of Linear Motion Conversion Mechanism 20>

The linear motion conversion mechanism 23 having the configuration in which the nut 25 moves linearly according to the rotation of the screw shaft 24 is adopted in the linear actuator 20 of the above embodiment. Conversely, the linear motion conversion mechanism in which the screw shaft moves linearly according to the rotation of the nut may be adopted.

Figure 7:
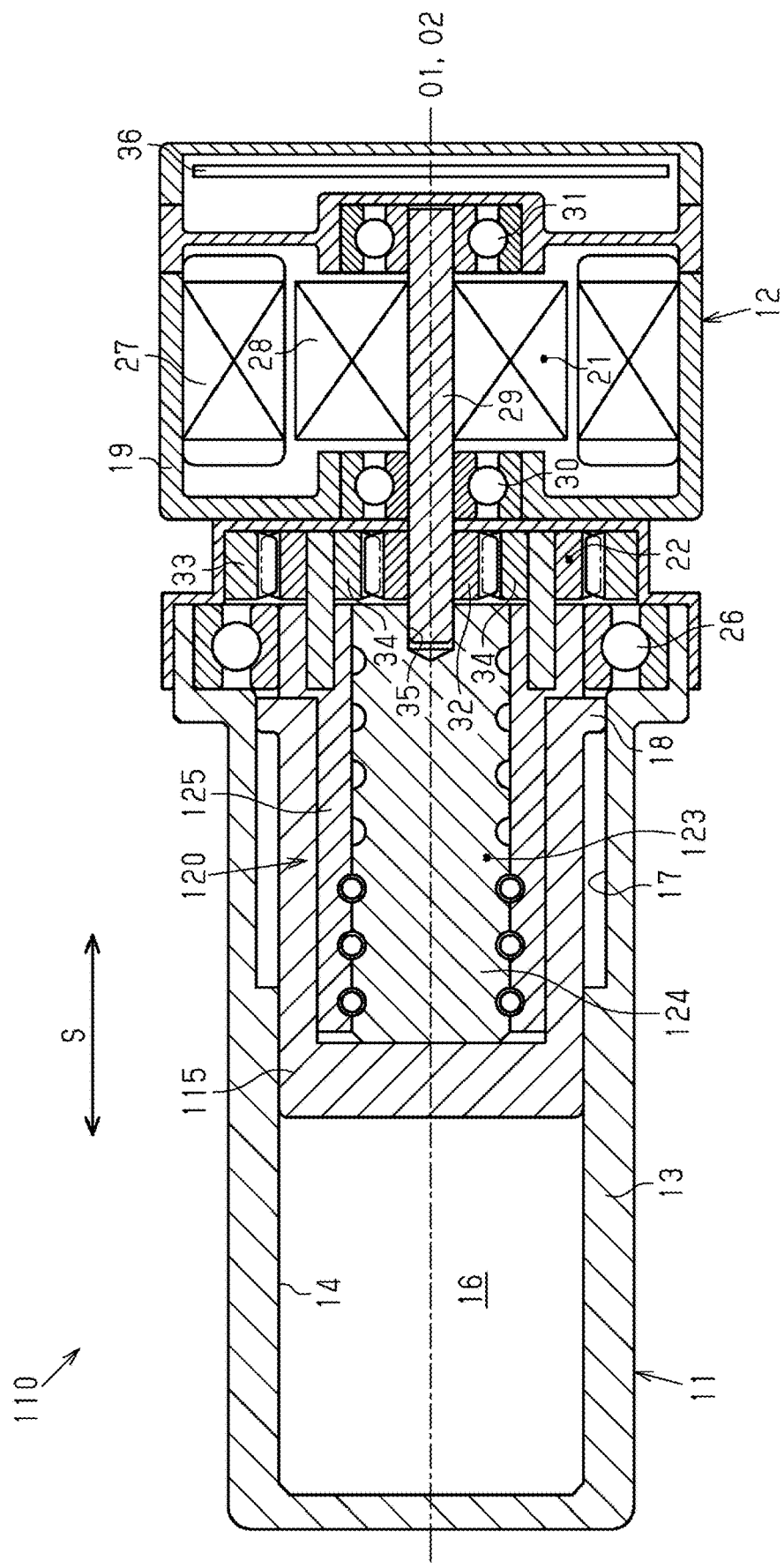
FIG. 7 is a cross-sectional view of an electric cylinder provided with a linear actuator of Modification 4.

FIG. 7 illustrates a cross-sectional structure of an electric cylinder 110 provided with a linear actuator 120 adopting such a linear motion conversion mechanism 123. The configurations of the electric motor 21 and the deceleration mechanism 22 in the linear actuator 120 are similar to those in the above embodiment. The linear motion conversion mechanism 123 in the linear actuator 120 includes a nut 125 rotatably attached to the case 13 by the bearing 26, and a screw shaft 124 screwed into the nut 125. In the linear motion conversion mechanism 123, the screw shaft 124 moves linearly according to the rotation of the nut 125. A piston 115 in the electric cylinder 110 is connected to the screw shaft 124 so as to move integrally in the stroke direction S. Furthermore, each planetary gear 34 of the deceleration mechanism 22 is rotatably attached to the nut 125 instead of the screw shaft 124 in the linear actuator 120. That is, the nut 125 also has the function as the planetary carrier of the planetary gear mechanism in the linear actuator 120.

The hole 35 into which the distal end portion of the motor shaft 60 can be inserted is formed in the screw shaft 124 also in the linear actuator 120. The axis alignment between the axis of rotation O1 of the nut 125 of the linear motion conversion mechanism 123 and the axis of rotation O2 of the rotor 28 of the electric motor 21 is performed by inserting the distal end portion of the motor shaft 60 into the hole 35. Therefore, the axial alignment between the electric motor 21 and the linear motion conversion mechanism 123 can be easily performed with high accuracy also in such a linear actuator 120. Note that the screw shaft 124 is allowed to move along the extending direction of the axis of rotation O1 of the nut 125 in the linear actuator 120. Therefore, it is desirable to align the electric motor 21 and the linear motion conversion mechanism 123 axially with each other in the state where the movement of the screw shaft 124 is restricted.

The ball screw mechanism is adopted as the linear motion conversion mechanisms 23 and 123 in the above embodiment and the modifications. Mechanisms other than the ball screw mechanism may be adopted as the linear motion conversion mechanisms 23 and 123 as long as the screw mechanism includes a screw shaft and a nut screwed into the screw shaft, and according to the rotation of one of the screw shaft and the nut, the other of the screw shaft and the nut moves linearly. There is a feed screw mechanism in which a screw shaft and a nut are directly screwed without balls as the screw mechanism that can be adopted as the linear motion conversion mechanisms 23 and 123.

<Deceleration Mechanism 22>

The planetary gear mechanism is adopted as the deceleration mechanism 22 in the embodiment and the modifications described above. Mechanisms other than the planetary gear mechanism may be adopted as the deceleration mechanism 22. There are a cycloidal speed reducer, a paradox gear, and a worm gear as the mechanism that can be adopted as the deceleration mechanism 22. In addition, the linear actuators 20 and 120 may be configured to directly connect the electric motor 21 and the linear motion conversion mechanisms 23 and 123 without providing the deceleration mechanism 22.

<Application of Linear Actuators 20 and 120>

The linear actuators 20 and 120 of the above embodiment and modifications are used as the actuators for driving the pistons 15 and 115 of the electric cylinders 10 and 110. The linear actuators 20 and 120 of the above embodiment and modifications can also be used for other applications.

<Application of Bearing Structure of Linear Actuator 20>

The structure related to the axial alignment of the screw shaft 24 and the rotor 28 in the embodiment and Modifications 1 to 3 can be used for the axial alignment between two rotating bodies that rotate relative to each other. Here, one of the two rotating bodies is a first rotating body, and the other is a second rotating body. As the axial alignment structure of these two rotating bodies, the following shaft member is provided. The shaft member is a shaft member that is positioned on the rotation axis of the first rotating body and extends along the rotation axis of the first rotating body, and is the shaft member that rotates integrally with the first rotating body. In addition, the second rotating body is provided with the following hole. The hole is located on the rotation axis of the second rotating body and extends along the rotation axis of the second rotating body. The hole is a hole into which the distal end portion of the shaft member can be inserted and which is in sliding contact with the distal end portion in the state where the distal end portion of the shaft member is inserted. In the state where the shaft member is inserted into such a hole, the rotation axis of the first rotating body and the rotation axis of the second rotating body are axially aligned. Therefore, the first rotating body and the second rotating body can be directly and axially aligned by inserting the shaft member into the hole provided in the second rotating body. Therefore, it is possible to easily and accurately perform the axial alignment between the electric motor and the linear motion conversion mechanism according to the axial alignment structure as described above.

When a base of the second rotating body is made of metal, the axial alignment structure can be configured according to Modification 1 described above. That is, a resin bush is attached to the base of the second rotating body. Then, a hole into which the shaft member is inserted is provided in the resin bush. In such a case, when both the rotating bodies are relatively rotated after the axial alignment, the hole of the resin bush rubs against the shaft member inserted into the hole, and the surface of the hole of the resin bush wears. The sliding resistance between the hole and the shaft member decreases due to the wear. Therefore, the relative rotation of both the rotating bodies can be smoothly performed even when the shaft member and the hole are tightly fitted in order to increase the coaxiality of both the rotating bodies.

In addition, in the case where the second rotating body is made of metal, the axial alignment structure can be configured according to Modification 2. That is, the sliding contact surface of the shaft member inserted into the hole in the second rotating body with the hole is formed of resin. In such a case, when both the rotating bodies are relatively rotated after the axial alignment, the sliding contact surface of the shaft member made of resin is worn due to the friction with the hole, and the sliding resistance between the hole and the shaft member decreases. Therefore, the relative rotation of both the rotating bodies can be smoothly performed even when the shaft member and the hole are tightly fitted in order to increase the coaxiality of both the rotating bodies.

<Other Technical Ideas>

Next, technical ideas that can be comprehended from the above embodiment and modifications will be described.

(a) An axial alignment structure of two rotating bodies installed rotatably, the axial alignment structure performing axial alignment between a first rotating body and a second rotating body that rotate relative to each other, the axial alignment structure including: a shaft member positioned on a rotation axis of the first rotating body and extending along the rotation axis of the first rotating body, the shaft member rotating integrally with the first rotating body; and a hole provided in the second rotating body, the hole positioned on the rotation axis of the second rotating body and extending along the rotation axis of the second rotating body, the hole being capable of receiving a distal end portion of the shaft member inserting into the hole, the hole being in sliding contact with the distal end portion in a state where the distal end portion of the shaft member is inserted.

(b) The axial alignment structure of the rotating bodies according to (a), wherein the second rotating body includes a metal base and a resin bush attached to the base, and the hole is provided in the bush.

(c) The axial alignment structure of the rotating bodies according to (a), wherein the second rotating body is made of metal, and a sliding contact surface of the shaft member with the hole is formed of resin.

(d) The linear actuator according to any one of claims 1 to 4, wherein the shaft member is connected to the rotor via a fragile portion that breaks according to the relative rotation between the rotor and the screw shaft caused by operation of the electric motor.

The invention claimed is:

1. A linear actuator comprising:
   a linear motion conversion mechanism including a screw shaft and a nut screwed onto the screw shaft, one of the screw shaft and the nut functioning as a rotatable rotation member, another of the screw shaft and the nut functioning as a linear motion member moving linearly according to a rotation of the rotation member;
   an electric motor including a rotor rotating coaxially with the rotation member, the electric motor rotating the rotation member according to the rotation of the rotor; and
   a shaft member connected to the rotor so as to rotate integrally with the rotor,
   the screw shaft being provided with a hole, wherein a first rotation axis of the rotation member and a second rotation axis of the rotor are aligned by the shaft member being inserted into the hole;
   wherein one of a contact surface of the hole with the shaft member and a contact surface of the shaft member with the hole has higher hardness than the other contact surface; and
   the contact surface of the hole with the shaft member and the contact surface of the shaft member with the hole being in sliding contact.

2. The linear actuator according to claim 1, wherein the screw shaft is the rotation member, and the nut is the linear motion member.

3. The linear actuator according to claim 2, wherein the rotation member includes a metal base and a resin bush attached to the base, and the hole is provided in the bush.

4. The linear actuator of claim 3, further comprising a planetary gear mechanism configured to decelerate the rotation of the rotor and transmit the decelerated rotation to the rotation member, the planetary gear mechanism including a sun gear connected to the shaft member and a planetary carrier connected to the rotation member.

5. The linear actuator according to claim 2, wherein the rotation member is made of metal, and a sliding contact surface of the shaft member with the hole is formed of resin.

6. The linear actuator of claim 5, further comprising a planetary gear mechanism configured to decelerate the rotation of the rotor and transmit the decelerated rotation to the rotation member, the planetary gear mechanism including a sun gear connected to the shaft member and a planetary carrier connected to the rotation member.

7. The linear actuator of claim 2, further comprising a planetary gear mechanism configured to decelerate the rotation of the rotor and transmit the decelerated rotation to the rotation member, the planetary gear mechanism including a sun gear connected to the shaft member and a planetary carrier connected to the rotation member.

8. The linear actuator according to claim 1, wherein the shaft member is connected to the rotor via a fragile portion that breaks according to the relative rotation between the rotor and the screw shaft caused by operation of the electric motor.

9. The linear actuator of claim 8, further comprising a planetary gear mechanism configured to decelerate the rotation of the rotor and transmit the decelerated rotation to the rotation member, the planetary gear mechanism including a sun gear connected to the shaft member and a planetary carrier connected to the rotation member.

10. The linear actuator of claim 1, further comprising a planetary gear mechanism configured to decelerate the rotation of the rotor and transmit the decelerated rotation to the rotation member, the planetary gear mechanism including a sun gear connected to the shaft member and a planetary carrier connected to the rotation member.

11. The linear actuator of claim 1, wherein a contact surface of the hole with the shaft member has lower hardness than a contact surface of the shaft member with the hole.

12. The linear actuator of claim 1, wherein a contact surface of the hole with the shaft member has higher hardness than a contact surface of the shaft member with the hole.

* * * * *